US005343511A

United States Patent [19]

Osada

[11] Patent Number: 5,343,511

[45] Date of Patent: Aug. 30, 1994

[54] METHOD FOR SELECTING A BROADCAST VOICE CHANNEL SERVED IN A TELEPHONE SWITCHING NETWORK, AND A SYSTEM THEREOF

[75] Inventor: Noriko Osada, Kawasaki, Japan

[73] Assignee: Fujitsu Limited, Kawasaki, Japan

[21] Appl. No.: 880,597

[22] Filed: May 8, 1992

[30] Foreign Application Priority Data

May 10, 1991 [JP] Japan .................................. 3-105301

[51] Int. Cl.[5] .............................................. H04M 11/00

[52] U.S. Cl. .......................................... 379/58; 379/59

[58] Field of Search ..................... 370/50, 109; 379/56, 379/58, 59, 61, 63, 354; 455/33.1; 358/85, 86

[56] References Cited

U.S. PATENT DOCUMENTS 4,712,229 12/1987 Nakamura ............................ 379/58

5,177,780 1/1993 Kasper et al. ......................... 379/59

*Primary Examiner*—Curtis Kuntz

*Assistant Examiner*—W. Cumming

*Attorney, Agent, or Firm*—Staas & Halsey

[57] ABSTRACT

A method for selecting one of broadcast voice channels served in a telephone network by a channel selector which is provided between the telephone network and a plurality of broadcast signal receivers for making a subscriber in the telephone network select a broadcast voice channel by making the subscriber initially call a switch provided in the telephone network so as to be connected to the channel selector and send a channel selecting signal to the channel selector through the switch, holding the connection between the subscriber and the switch as it is, in response to an inquiring signal sent from the channel selector in correspondent to the initial call. The channel selector makes the subscriber select another broadcast voice signal by making the subscriber perform hooking and send another channel selecting signal to the channel selector through the telephone network, holding connection between the subscriber and the switch as it is.

7 Claims, 4 Drawing Sheets

METHOD FOR SELECTING A BROADCAST VOICE CHANNEL SERVED IN A TELEPHONE SWITCHING NETWORK, AND A SYSTEM THEREOF

BACKGROUND OF THE INVENTION

1. Field of the Invention

The present invention relates to a method and system for selecting a broadcast voice channel from a plurality of broadcast voice channels provided in a telephone network as a telephone service.

2. Description of the Related Art

A broadcast voice service is provided in a telephone network for making subscribers listen to broadcast voices sent from a plurality of broadcast stations.

FIG. 1 is an example illustrating a selecting system of the related art in a telephone network 5. In FIG. 1, a plurality of radio broadcast receivers (RADIO Rx) $3_1$to $3_n$ located at a station of a toll switch (TS) 51 receive a plurality of radio signals $2_1$ to $2_n$ transmitted from a plurality of radio broadcast stations (RADIO STN) $1_1$ to $1_n$ respectively and convert the radio signals $2_1$ to $2_n$ into a plurality of voice signals $7_1$ to $7_n$ each having a voice bandwidth matched to a specific character of lines in telephone network 5. The voice signals $7_1$ to $7_n$ are sent to trunks (TRKs) ($511_1$ to $511_n$) in TS 51 through a plurality of line controllers (LINE CONT) $4_1$ to $4_n$ respectively, located between RADIO Rxes $3_1$ to $3_n$ and TRKs $511_1$ to $511_n$ respectively.

In telephone network 5, there are plurality of TSes 51, local switches (LSes) 52 connected to TS 51 and subscribers (SUBs) 6 connected to LS 52. One SUB 6, TS 51 and LS 52 are representatively depicted in FIG. 1. The telephone network 5 provides special dialing numbers ($DN_1$ to $DN_n$) for servicing the broadcast voices from RADIO STNs $1_1$ to $1_n$ to SUB 6. When, SUB 6 dials $DN_1$ comprised of, for example, a toll number of TS 51 and a special number 1XX1, a speech path network 512 in telephone network 5 connects SUB 6 with TRK $511_1$ correspondent to RADIO STN $1_1$. Then, TRK $511_1$ sends a triggering signal to LINE CONT $4_1$ so that LINE CONT $4_1$ sends a voice signal output from RADIO Rx $3_1$, back to SUB 6 through speech path network 512 and LS 52. Thus, SUB 6 can select the broadcast voice from RADIO STN $1_1$ by dialing.

Listening to a broadcast voice from RADIO STN $_1$1, if SUB 6 wants to listen to another broadcast voice from, for example, RADIO STN $1_n$, SUB 6 releases the connection with TRK $511_1$ once and makes another call by dialing $DN_n$ comprised of the toll number of TS 51 and another special number 1XXn, so as to connect to TRK $511_n$. When TRK $511_n$ is connected with SIB 6, TRK $511_n$ produces a triggering signal and sends it to LINE CONT $4_n$ so that LINE CONT $4_n$ sends the broadcast voice correspondent to RADIO STN $1_n$, back to SUB 6 through $TRK_n$, speech path network 512 and LS 52.

PROBLEM IN THE RELATED ART

As seen from the above, there have been problems in the related art that when SUB 6 listens to a broadcast voice and wants to change to listen the broadcast voice from another RADIO STN for listening, SUB 6 must hook on once and make another call by dialing a number corresponding to another RADIO STN, and when SUB 6 repeats dialing for selecting the broadcast voice, SUB 6 must repeatedly dial and pay higher telephone rates.

SUMMARY OF THE INVENTION

Therefore, an object of the present invention is to release the subscriber's task of hooking on and one by one dialing to select the broadcast voice in succession.

Another object of the present invention is to reduce the telephone rate charged to the subscriber when the subscriber selects the broadcast voice by listening to several broadcast voices.

Yet another object of the present invention is to raise the operating efficiency of a switch in a telephone network when the telephone network services the broadcast voices.

The above objects are accomplished by providing a new selecting system of the broadcast voice to the telephone network having the broadcast voice service, so as to be used by the subscribers. In accordance with the new selecting system, the selection of the broadcast voice required to be sent to the subscriber is performed in the following steps.

(the first step) The subscriber makes a call to receive the broadcast voice service in the telephone network, by dialing a designated number (a first number) of a switch, which is provided in the telephone network, operationally connected to a channel selector provided for selecting a broadcast voice required, by the subscriber, to listen to.

(the second step) When the first number is dialed by the subscriber, the first number designates a trunk in the switch. Then, the trunk triggers the channel selector, so that the channel selector sends an inquiring voice to the subscriber for inquiring of the subscriber the broadcast voice to be selected by the subscriber, sending an inquiring tone to the subscriber. After the subscriber receives the inquiring tone, the subscriber sends an channel selecting signal to the channel selector by operating push button for example.

(the third step) Receiving the channel selecting signal through the trunk, the channel selector selects the broadcast voice the subscriber requires to listen to and sends the selected broadcast voice to the subscriber.

(the fourth step) When the subscriber changes to listen to another broadcast voice while the subscriber listens to the present broadcast voice, the subscriber hooks once and sends another channel selecting signal to the channel selector through the trunk, holding the connection between the subscriber and the trunk as it is, as is done in the second step.

Because of applying the new selecting system to the telephone network, the change of the selection of the broadcast voice can be performed without dialing separately. Therefore, the subscriber need not dial many times to select the broadcast voice, the telephone rates can be reduced, and the operating efficiency of the switch can be raised.

BRIEF DESCRIPTION OF THE DRAWINGS

FIG. 4 is a flowchart to show steps for selecting the broadcast voice the subscriber requires to listen to.

DESCRIPTION OF THE PREFERRED EMBODIMENTS

Figure 1:
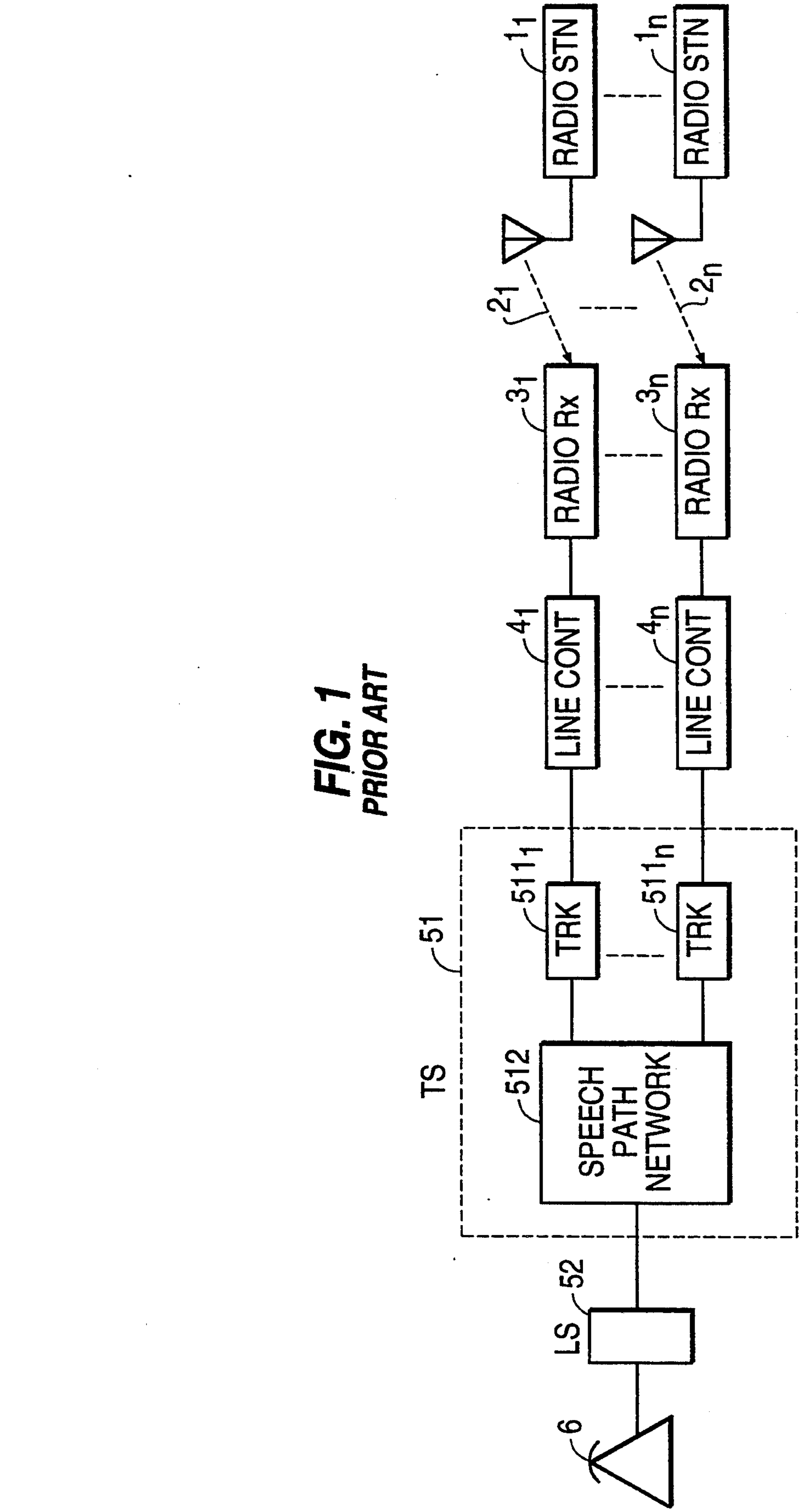
FIG. 1 PRIOR ART
FIG. 1 is a block diagram of a prior art channel selecting system.
Figure 2:
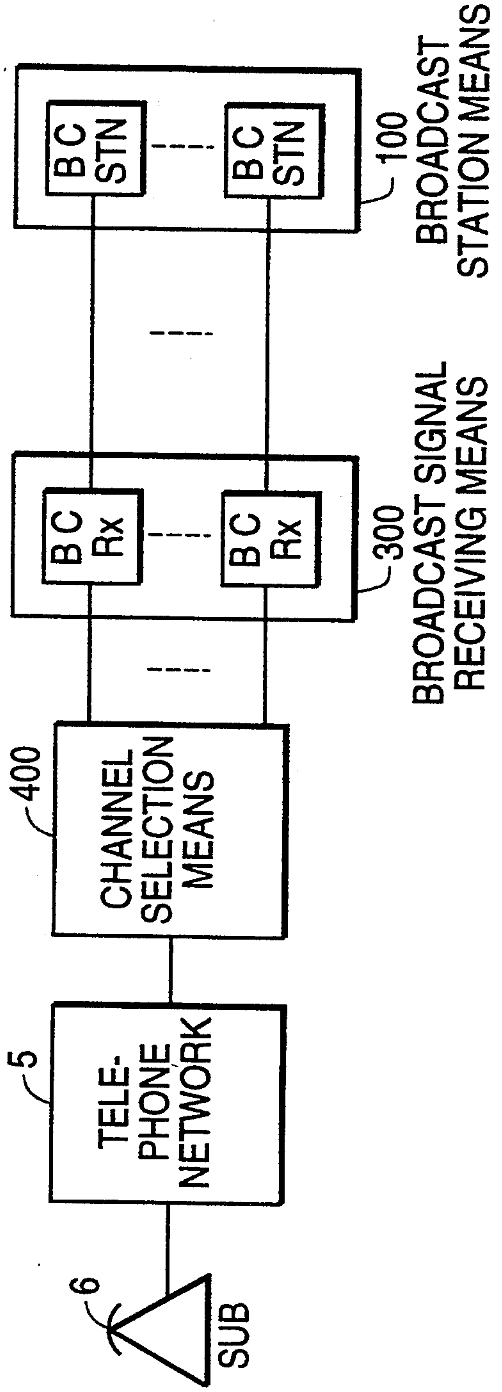
FIG. 2 is a block diagram for illustration a principle of an invented channel selecting system.

FIG. 2 is a block diagram for illustrating a principle of the present invention. In FIG. 2, the same reference numeral as in FIG. 1 designates the same unit as in FIG. 1. The following means are included in FIG. 1: broadcast station means of the related art having reference numeral 100 which represents a plurality of broadcast stations (BC STNs) being not only the radio broadcast stations like RADIO STNs $1_1$ to $1_n$ in FIG. 1, but, also wire broadcast stations which will be explained later; broadcast signal receiving means of the related art having reference numeral 300 which represents a plurality of broadcast signal receivers (BC Rxes) like RADIO Rxes $3_1$ to $3_n$ in FIG. 1; and channel selection means of the present invention having reference numeral 400, for selecting one of broadcast voice signals sent from broadcast signal receiving means 300, by a channel selecting signal sent from SUB 6.

In FIG. 2, broadcast signal receiving means 300 receives the broadcast signals transmitted from broadcast station means 100 and outputs voice signals of the broadcast station means 100 to the channel selection means 400. When SUB 6 needs to listen to a broadcast voice of a designated BC STN, SUB 6 dials a special dialing number for the broadcast voice from the designated BC STN. Then, a channel selecting signal is produced in telephone network 5 so as to be sent to channel selection means 400. When channel selection means 400 receives the channel selecting signals, channel selection means 400 inquires of SUB 6 which broadcast voice he requires to listen to, through telephone network 5. Responding to the inquiry, SUB 6 sends a channel selecting signal corresponding to the required broadcast voice to the channel selection means 400 by dialing another special number corresponding to the designated BC STN, holding the trunk in telephone network 5 as it is. Receiving the channel selecting signals from SUB 6, the channel selection means 400 selects the broadcast voice of the designated BC STN and sends it to SUB 6 through telephone network 5, so that SUB 6 can listen the required broadcast voice.

Providing the channel selection means 400 thus in the present invention, it becomes unnecessary that for SUB 6 to repeat dialing, as is done in the prior art when SUB 6 selects a broadcast voice by listening to broadcast voices in succession. The SUB 6 can select a broadcast voice only by setting the special number corresponding to BC STN, thus holding a call as is set initially.

Figure 3:
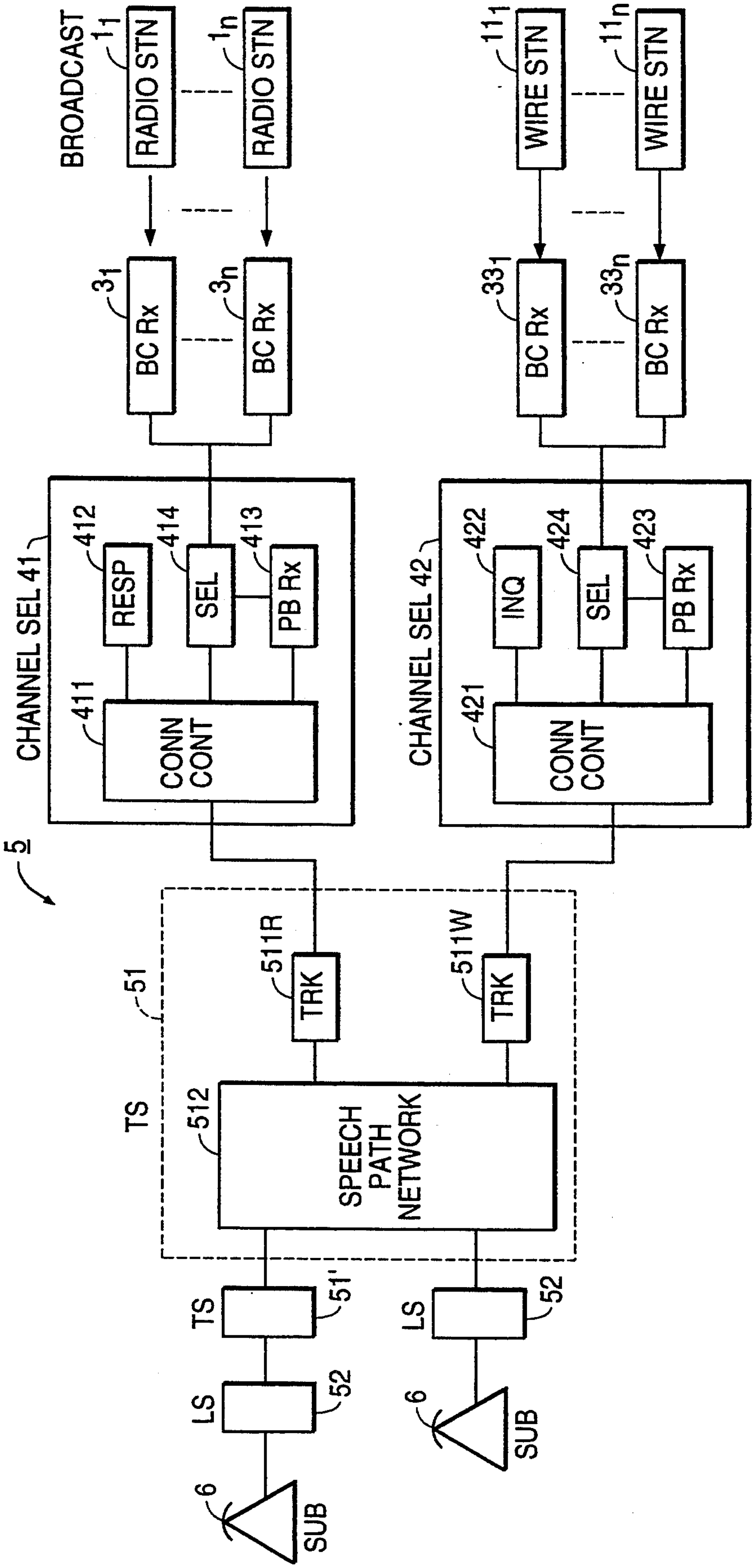
FIG. 3 is a block diagram for showing an invented channel selecting system.
Figure 4:
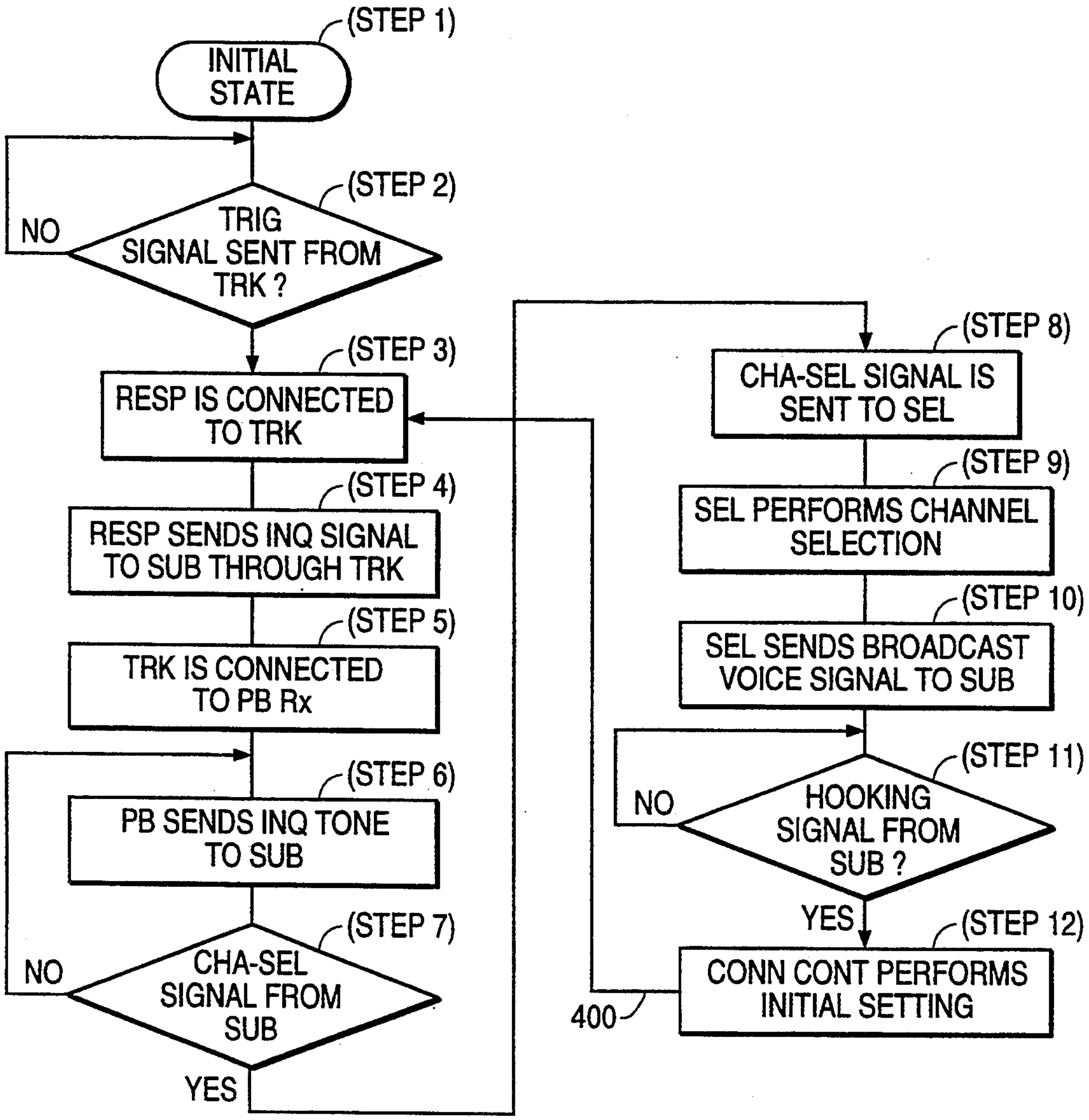

A preferred embodiment of the present invention will be described in reference to FIGS. 3 and 4. FIG. 3 is a block diagram embodying the present invention. FIG. 4 is a flowchart for explaining the selecting steps of the broadcast voice, performed in FIG. 3. In FIG. 3, a reference numeral or symbol same as in FIG. 1 designates the same object as in FIG. 1, and through FIGS. 3 and 4, the same reference numeral or symbol designates the same object.

In FIG. 3, channel selectors (CHANNEL SELs) 41 and 42 are provided for the present invention, constituting channel selection means 400 in FIG. 1. Adding to RADIO STNs $1_1$ to $1_n$, wire broadcast stations (WIRE STNs) $11_1$ to $11_n$ are depicted in FIG. 3, constituting broadcast station means 100 in FIG. 1. As explained in reference to FIG. 1, the radio signals from RADIO STNs $1_1$ to $1_n$ are received and converted to broadcast voice signals at RADIO Rxes $3_1$ to $3_n$. However, in the present invention, the broadcast voice signals output from RADIO Rxes $3_1$ to $3_n$ are sent to a selecting unit (SEL) 414 in CHANNEL SEL 41 respectively. Meanwhile, broadcast signals output from WIRE STNs $11_1$ to $11_n$ are sent to BC Rxes $33_1$ to $33_n$ of the prior art through wires and converted to broadcast voice signals each having the same character as the character of the voice signal sent to CHANNEL SEL 42. The broadcast voice signals output from BC Rxes $33_1$ to $33_n$ are sent to SEL 424 in CHANNEL SEL 42. Different from FIG. 1, in FIG. 3, two trunks, TRK 511R and TRK 511W, are provided in TS 51. The TRK 511R is connected to CHANNEL SEL 41, for treating the broadcast voice signals of RADIO STNs $1_1$ to $1_n$, and TRK 511W is connected to CHANNEL SEL 42, for treating the broadcast voice signals for WIRE STNs $11_1$ to $11_n$. The reason of providing CHANNEL SELs 41 and 42 in FIG. 3 is that a telephone service rate for listening to the radio broadcast voice is different from that for listening to the wire broadcast voice. However, TRKs 511R and 511W have the same function. Therefore, the present invention will be explained below, using only CHANNEL SEL 41 as an example.

In FIG. 3, the selection of a broadcast voice signal from the broadcast voice signals of RADIO STNs $1_1$ to $1_n$ is performed in accordance with steps explained below in reference to FIG. 4. In the following description of the steps, the sequence of the steps is represented by step numbers put in parentheses. The same step numbers are indicated in FIG. 4.

(step 1) The broadcast voice signals are sent from BC Rxes $3_1$ to $3_n$ to SEL 414. However, in an initial state, before a signal for requiring the listening to the broadcast voices is not sent from SUB 6 to SEL 414, SEL 414 does not select any of broadcast voice signals of RADIO STNs $1_1$ to $1_n$. In FIG. 3, the selection of the broadcast voice signals performed at SEL 414 will be called "channel selection" hereinafter.

Different from the prior art explained in reference to FIG. 1, in the present invention, telephone network 5 specially provides two common dialing numbers to SUBs 6, for giving the telephone broadcast voice services of the radio broadcast and the wire broadcast. Therefore, two trunks, TRK 511R and TRK 511W, are provided in TS 51 for the telephone broadcast voice services of the radio broadcast and the wire broadcast, respectively. The common dialing number for the radio broadcast voice service will be called "$DN_R$" hereinafter The common dialing number for the wire broadcast voice service is called "$DN_W$".

Since the common dialing number includes no information on channel selection, other selecting numbers $CH_1$ to $CH_n$ will be explained below in case of CHANNEL SEL channel selection. A way of using the selecting numbers $CH_1$ to $CH_n$ will be explained below in case of CHANNEL SEL 41.

(step 2) When SUB 6 makes a call by dialing $DN_R$, telephone network 5 connects SUB 6 to TRK 511R connected to CHANNEL SEL 41, through LS 52 and another TS 51' if they are placed between SUB 6 and TS 51, by the well known telephone network procedure. When SUB 6 is connected to TRK 511R, TRK 511R produces a triggering signal (TRIG SIGNAL) and sends it to a connection controller (CONN CONT) 411 in CHANNEL SEL 41.

(step 3) Triggered by TRIG SIGNAL from TRK 511R, CONNECT CONT 411 connects TRK 511R with a vocal responder (RESP) 412 in CHANNEL SEL 41.

(step 4) Then, RESP 412 sends an inquiring vocal signal (INQ SIGNAL) to SUB 6 through TRK 511R, TS 51' and LS 52 (telephone network 5), for inquiring of SUB 6 to dial a channel selecting number after SUB 6 hears an inquiring tone which will be explained in step 6.

(step 5) After RESP 412 sends INQ SIGNAL, CONN CONT 411 release the connection between TRK 511R and RESP 412 and connects TRK 511R with a push button signal receiver (PB Rx) 413 in CHANNEL SEL 41.

(step 6) Then, PB Rx 413 sends an inquiring tone (INQ TONE) to SUB 6. When SUB 6 receives INQ TONE, SUB 6 dials a channel selecting number, e.g. $CH_1$ if SUB 6 wants to listen to a broadcast voice of RADIO STN $\mathbf{1}_1$, by dialing or operating, for example, push buttons.

(step 7) A channel selecting signal (CHA-SEL SIGNAL) correspondent to $CH_1$ is sent from SUB 6 to PB Rx 413 through telephone network 5.

(step 8) When PB Rx 413 receives CHA-SEL SIGNAL correspondent to $CH_1$, PB Rx 413 sends the CHA-SEL SIGNAL to SEL 414.

(steps 9 and 10) Then, SEL 414 selects a channel correspondent to $CH_1$ and sends a broadcast voice signal from BC Rx $3_1$ to CONN CONT 411, and CONN CON 411 sends the broadcast voice signal to SUB 6 through telephone network 5. As a result, SUB 6 can listen to the broadcast voice of RADIO STN $\mathbf{1}_1$.

(step 11) When SUB 6 wants to listen to another broadcast voice of RADIO STN $\mathbf{1}_i$ (i is one of numerals 2 to n) while SUB 6 is listening to a broadcast voice of RADIO STN $\mathbf{1}_1$, SUB 6 makes hooking, holding the connection between SUB 6 and TRK 511R as it is, so that a hooking signal is transferred from SUB 6 to CONN CONT 411 through telephone network 5.

(step 12) When CONN CONT 411 receives the hooking signal, CONN CONT 411 sets SEL 414 back to the initial state so as not to select any channels of the broadcast voice signals of RADIO STNs $1_1$ to $1_n$ and makes RESP 412 connect with TRK 511R.

(repeat steps 3 to 10) Then, the same steps as explained in steps 3 to 10 are performed as indicated by a connection line 400 in FIG. 4, so that SUB 6 can listen to the another broadcast voice of RADIO STN $\mathbf{1}_i$.

As seen from the above, when SUB 6 is listening to a broadcast voice and wants to listen to another broadcast voice, SUB 6 can select another broadcast voice only by hooking and dialing the channel selecting signal of requiring RADIO STN, holding the connection between SUB 6 and TRK 511R or CHANNEL SEL 41 as it is.

Though the matter of the prior art, BC Rx $3_1$ to $3_n$ or $33_1$ to $33_n$ can be gathered to a broadcast receiver having a plurality of receiving units corresponding to radio stations, respectively.

What is claimed is:

1. A method performed by subscribers in a telephone network, for selecting a broadcast voice channel from broadcast voice channels provided in the telephone network which includes switches operatively connected to the subscribers and broadcast signal receivers each converting a broadcast signal sent from a broadcast station, to a broadcast voice signal, said method comprising the steps of:

accessing the switch by dialing a designated dialing number for designating the switch;

receiving a response signal sent from channel selection means provided between the switch and the broadcast receivers, said response signal being sent to the subscriber in response to the dialing performed in said step of accessing and comprising an inquiring signal for inquiring of the subscriber to send a channel selecting signal to the channel selection means through the telephone network, and said channel selecting signal being a signal for selecting one of the broadcast voice signals of the broadcast stations;

sending the channel selecting signal to the channel selection means through the telephone network, by dialing a channel selecting number while holding a connection between the subscriber and the switch, after receiving the response signal from the channel selection means; and receiving the broadcast voice signal selected at the channel selection means in accordance with the channel selecting signal sent from the subscriber.

2. A selecting method according to claim 1, said method further comprising the steps of sending another channel selecting signal to the channel selection means through the telephone network, by hooking and dialing another channel selecting number while holding the connection between the subscriber and the switch, when the subscriber selects another broadcast voice channel while the subscriber is receiving a former broadcast voice signal.

3. A selecting method according to claim 1, wherein:

said response signal used in said step of receiving the response signal, further comprises an inquiring tone signal sent to the subscriber after said inquiring signal is sent to the subscriber; and said step of sending the channel selecting signal is performed after the subscriber recognizes that the inquiring tone signal is arrived from the channel selection means.

4. A selecting method according to claim 1 wherein said inquiring signal used in said step of receiving the response signal is a vocal signal to which the subscriber listens.

5. A channel selecting system for selecting a broadcast voice channel from broadcast voice channels provided in a telephone network including subscribers and switches operationally connected with the subscribers and broadcast signal receivers converting broadcast signals sent from broadcast stations, to broadcast voice signals respectively, said system comprising channel selection means provided between one of the switches and the broadcast signal receivers, for selecting one of the broadcast voice signals, said channel selecting system comprising:

channel selection means provided between the one of the switches and the broadcast signal receivers for selecting one of the broadcast voice channels in response to a subscriber's requirement of selecting the broadcast voice channel, said channel selection means comprising:

responder means for responding to the subscriber by sending an inquiring signal through the switch when the subscriber makes a call to the switch for selecting the broadcast voice channel by dialing a designated dialing number; and selector means connected with the broadcast signal receivers, for selecting one of the broadcast voice signals sent from the broadcast signal receivers when the subscriber sends a channel selecting signal to said selector means through the switch by dialing a channel number while holding a connection between the subscriber and the switch, after receiving the inquiring signal from said responder means, and for sending the selected broadcast voice to the subscriber through the switch, said selector means for selecting another broadcast voice signal to the subscriber when the subscriber performs hooking and sending the another broadcast voice signal and sends a channel selecting signal to said selector means through the one of the switches by dialing a channel number while holding a connection between the subscriber and the switch, and for sending the another broadcast voice signal to the subscriber through the switch.

6. A channel selecting system according to claim 5, wherein said channel selection means further comprises:

channel selecting signal receiver means for sending an inquiring tone to the subscriber after the inquiring signal is sent from said responder means to the subscriber and for transferring the channel selecting signal received from the subscriber to said selector means, said inquiring tone being used by the subscriber so that the subscriber sends the channel selecting signal after receiving said inquiring tone while holding a connection between the subscriber and the one of the switches; and connection controller means for controlling connection of signals transferred among said responder means, said selector means, said channel selecting signal receiver means, the one of the switches and the subscriber.

7. A selecting method according to claim 3, wherein said inquiring signal used in said step of receiving the response signal is a voice signal to which the subscriber listens.

* * * * *

UNITED STATES PATENT AND TRADEMARK OFFICE

CERTIFICATE OF CORRECTION

PATENT NO. : 5,343,511

DATED : August 30, 1994

INVENTOR(S) : NORIKO OSADA

It is certified that error appears in the above-indentified patent and that said Letters Patent is hereby corrected as shown below:

Column 3, line 22, after "from" insert --the--;

line 45, delete "that".

Column 4, line 3, after "41" insert --,--;

line 17, "of" should be --for--.

Signed and Sealed this

Thirty-first Day of January, 1995

Attest:

Bruce Lehman

BRUCE LEHMAN

*Attesting Officer* *Commissioner of Patents and Trademarks*

UNITED STATES PATENT AND TRADEMARK OFFICE

CERTIFICATE OF CORRECTION

PATENT NO. : 5,343,511

DATED : August 30, 1994

INVENTOR(S) : NORIKO OSADA

It is certified that error appears in the above-indentified patent and that said Letters Patent is hereby corrected as shown below:

Column 1, line 29, delete ",";

line 54, change "SIB" should be --SUB--.

Signed and Sealed this

Thirtieth Day of May, 1995

Attest:

Bruce Lehman

BRUCE LEHMAN

*Attesting Officer* *Commissioner of Patents and Trademarks*